United States Patent

Veronesi

[11] Patent Number: 5,690,180
[45] Date of Patent: Nov. 25, 1997

[54] HORIZONTAL-AXIS CUTTER FOR SOIL CULTIVATION

[75] Inventor: Flavio Veronesi, Nogara, Italy

[73] Assignee: Rotomec S.p.A., Nogara, Italy

[21] Appl. No.: 616,666

[22] Filed: Mar. 15, 1996

[30] Foreign Application Priority Data

Apr. 3, 1995 [IT] Italy .................................. PC950004 U
Nov. 3, 1995 [IT] Italy .................................. PC950018 U

[51] Int. Cl.$^6$ .................................................. A01B 33/00
[52] U.S. Cl. .......................... 172/112; 172/540; 172/78; 172/47; 172/72
[58] Field of Search .................................. 172/112, 540, 172/47, 117, 78, 508, 509, 49.5, 32, 72, 63; 171/112

[56] References Cited

U.S. PATENT DOCUMENTS

| | | | |
|---|---|---|---|
| 3,557,880 | 1/1971 | Van Der Lely | 172/112 X |
| 4,043,402 | 8/1977 | Nelson | 172/112 |
| 4,127,074 | 11/1978 | Van Der Lely et al. | 172/112 X |
| 4,152,993 | 5/1979 | Van Der Lely et al. | 172/112 X |
| 4,240,508 | 12/1980 | Ishiguro et al. | 172/112 X |
| 4,254,834 | 3/1981 | Van Der Lely et al. | 172/112 |
| 4,267,891 | 5/1981 | Van Der Lely et al. | 172/112 X |
| 4,386,661 | 6/1983 | McCanse et al. | 172/112 |
| 4,669,549 | 6/1987 | Sanpei et al. | 172/112 |
| 4,910,948 | 3/1990 | Nelson | 172/78 X |
| 4,958,457 | 9/1990 | Doskocil | 172/112 X |
| 5,287,933 | 2/1994 | Lindblom | 172/112 |
| 5,303,780 | 4/1994 | Evenson | 172/509 |

Primary Examiner—Terry Lee Melius
Assistant Examiner—Victor Batson
Attorney, Agent, or Firm—Notaro & Michalos P.C.

[57] ABSTRACT

A horizontal-axis cutter for soil cultivation of the type comprising a horizontal-axis rotor (2) fitted with a number of blades and a gear motor (4), connected on one side to the power take-off of the tractor and on the other to the rotor, in which the gear motor is located in the front part of the machine, forward of a vertical axis A—A passing through the rotor axis.

The cutter includes a pair of stiffening bars (10, 11), one fitted at the front of the machine and the other at the back of it, the stiffening bars constituting an integral part of the machine frame and being able to slide inside corresponding seatings in a support (1) to be connected to the power take-off of the tractor.

8 Claims, 5 Drawing Sheets

5,690,180

HORIZONTAL-AXIS CUTTER FOR SOIL CULTIVATION

FIELD AND BACKGROUND OF THE INVENTION

This invention relates to a soil cultivation cutter of the type comprising a horizontal-axis rotor with a number of blades to break down the soil, the cutter being characterised by the special configuration of the frame, which can be moved and positioned as required in relation to its support so that it also acts as an accident prevention device, with no need to fit guards or barriers to the machine which would increase its size.

These results are obtained by using a pair of frame stiffening bars (a front bar fitted approximately at the third point of the connector and a rear bar) and moving the drive pulley forward of the venial axis passing through the rotor axis.

Soil cultivation cutters usually comprise a box frame to which the rotor is fitted, a pair of side slides of adjustable height so that the cultivation depth can be regulated, and a drive which usually comprises a bevel gear pair designed for connection to the power take-off of the tractor via a Cardan shaft and that activates a pulley connoted, via a chain or the like, to a second pulley splined to the rotor shaft.

In known horizontal-axis cutters, the unit comprising the bevel gear pair and drive pulley is located towards the back of the machine, ie. to the rear of an approximately vertical axis passing through the rotor axis.

The need to guarantee better operator safety has led manufacturers to fit guards which prevent the lower limbs from coming into contact with the moving parts of the machine while it is operating.

In addition to the installation of fixed or mobile panels at the sides and back of the machine, it has therefore become common practice to fit protection devices to the cutter, such as bars secured to the frame by supports in order to create a barrier running all round the machine at a distance of approx. 20–30 cm from it, to prevent intentional or accidental access to the moving parts.

This system, however, involves a number of drawbacks.

Primarily, the overall size of the machine is considerably increased; it thus becomes more cumbersome, and requires more storage and transport space.

An additional part is also required, namely the protective bar, which is fitted to the frame, thus increasing not only the overall dimensions but also the weight of the machine.

In known mechanical hoes the front and rear edges of the support integral with the three-point connector face backwards, so as to form two seatings into which the outward-projecting edges of the box frame of the machine are inserted so that they can slide.

This makes the system hard to maneuver, as the machine frame often jams when it is slid along the supports, making the hoe positioning operation difficult.

SUMMARY OF THE INVENTION

This invention relates to a horizontal-axis cutter for soil cultivation in which the frame is designed in such a way as to ensure a high level of rigidity of the machine and at the same time to act as a protection device, eliminating the need to fit special bars or guards, and achieving the same results with a more compact machine which is also cheaper to manufacture.

This objective is attained by fitting a pair of stiffening bars, one at the front and the other at the back of the machine, which constitute an integral part of the frame and also act as a protection device, and at the same time moving the drive unit that connects the machine to the power take-off of the tractor via a Cardan shaft forward of an axis passing through the centre of the rotor.

The protruding edges of the box frame of the machine can slide in corresponding seatings in the support integral with the 3-point connector.

BRIEF DESCRIPTION OF THE DRAWINGS

This invention will now be described in detail, by way of example but not of limitation, by reference to the annexed figures in which.

DESCRIPTION OF THE PREFERRED EMBODIMENT

Figure 1:
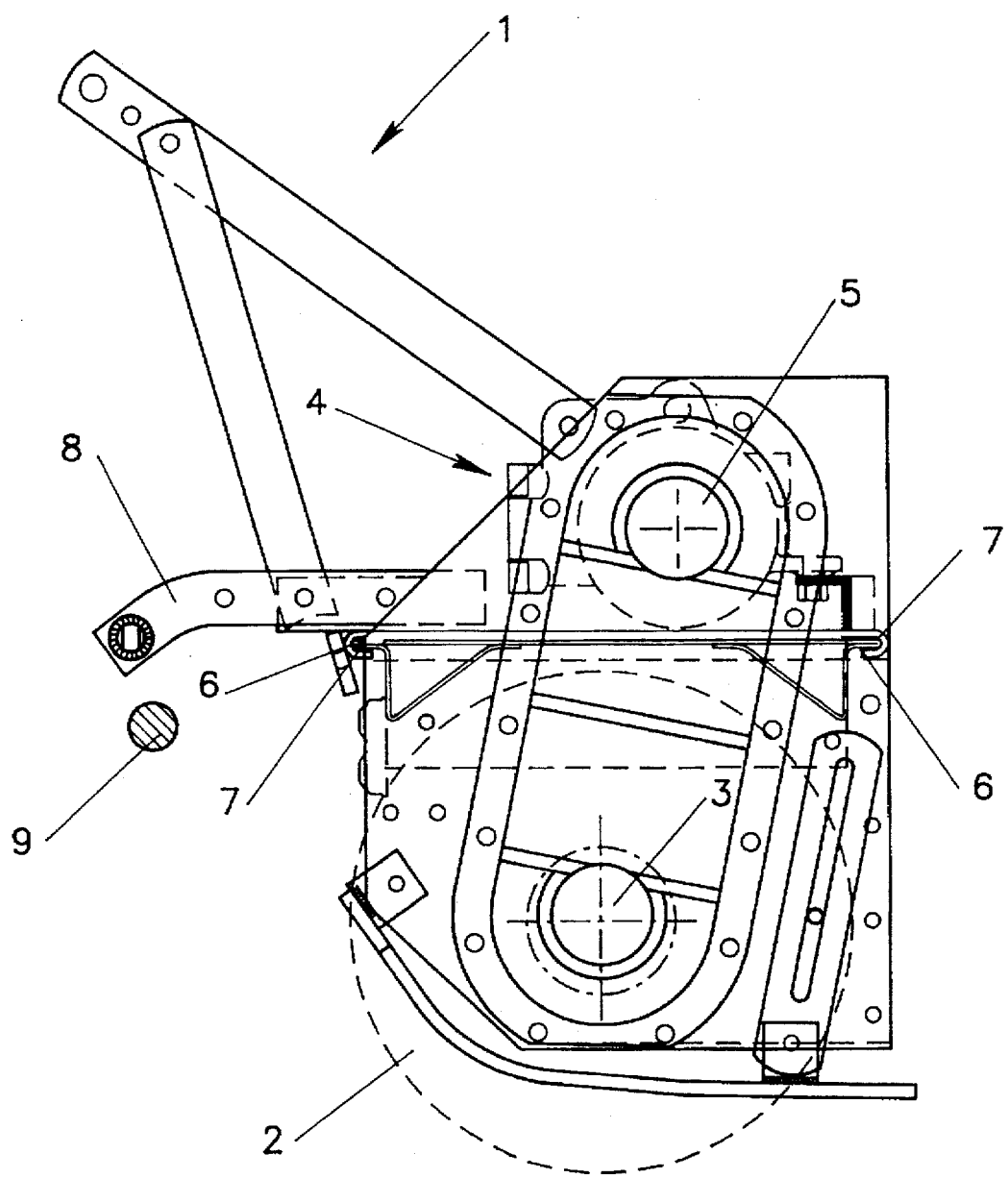
FIG. 1 is the side view of a cutter made in accordance with the known technique

FIG. 1 is annexed to this description to allow comparison of the two systems and facilitate comprehension of the characteristics of the cutter in accordance with the invention.

With reference to FIG. 1, no. 1 indicates the 3-point connector or support designed for connection to the tractor, no. 2 indicates the cutter rotor fitted to a horizontal-axis shaft 3, and no. 4 indicates the drive unit which enables the mechanical parts to be connected to the power take-off of the tractor and motion to be transmitted to a cogwheel 5, which in turn transmits it, via a chain or the like, to a wheel splined to shaft 3.

The machine has a box frame, the edges of which, marked 6, are inserted in such a way as to slide in seatings 7, which are integral with arms 8 of support 1 used for connection to the tractor.

An accident-prevention bar or protective device, illustrated schematically and indicated as no. 9, is fitted to the front of the machine at a sufficient distance from the rotors.

Figure 2:
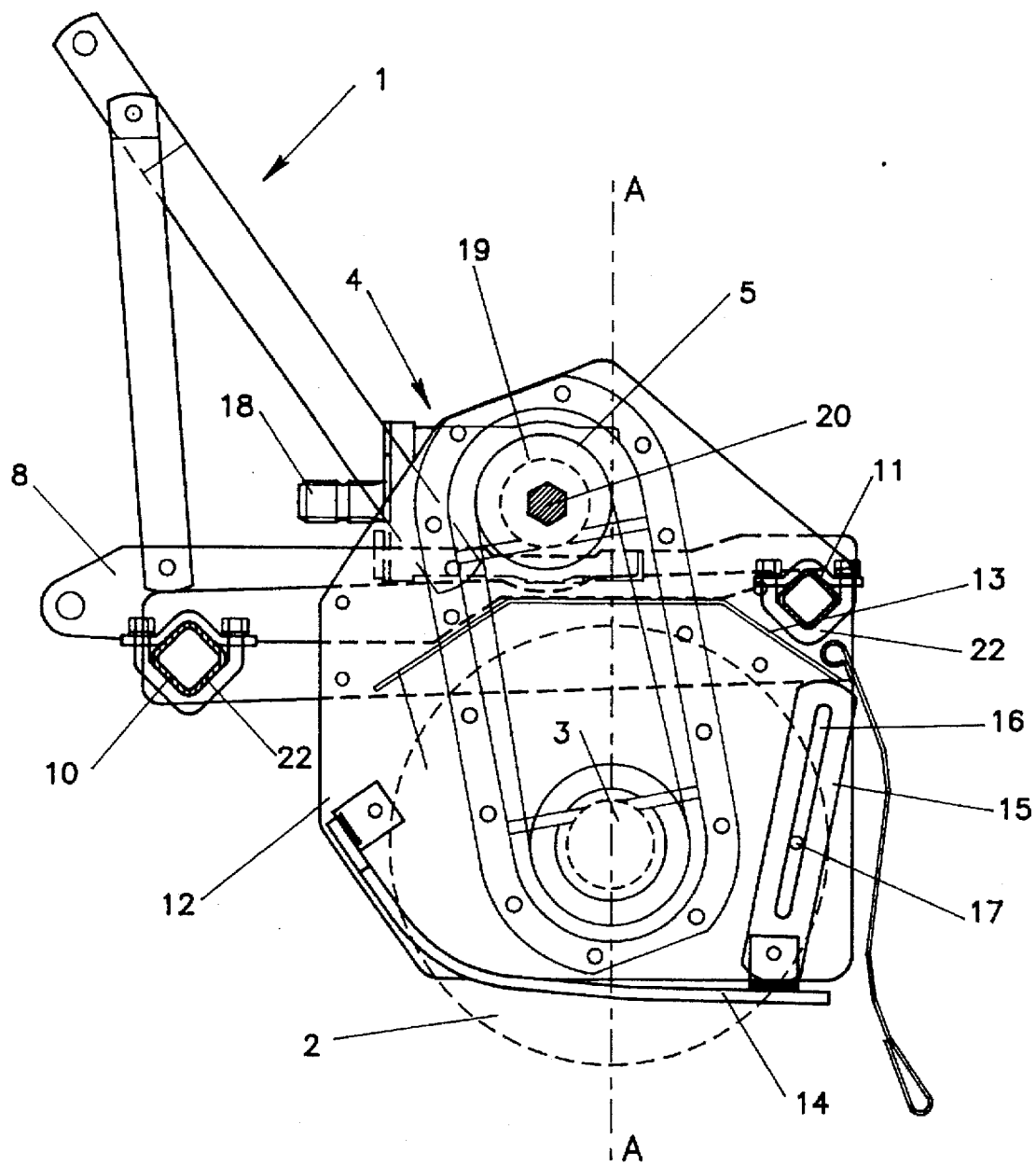
FIG. 2 is the side view of a cutter in accordance with the invention
Figure 3:
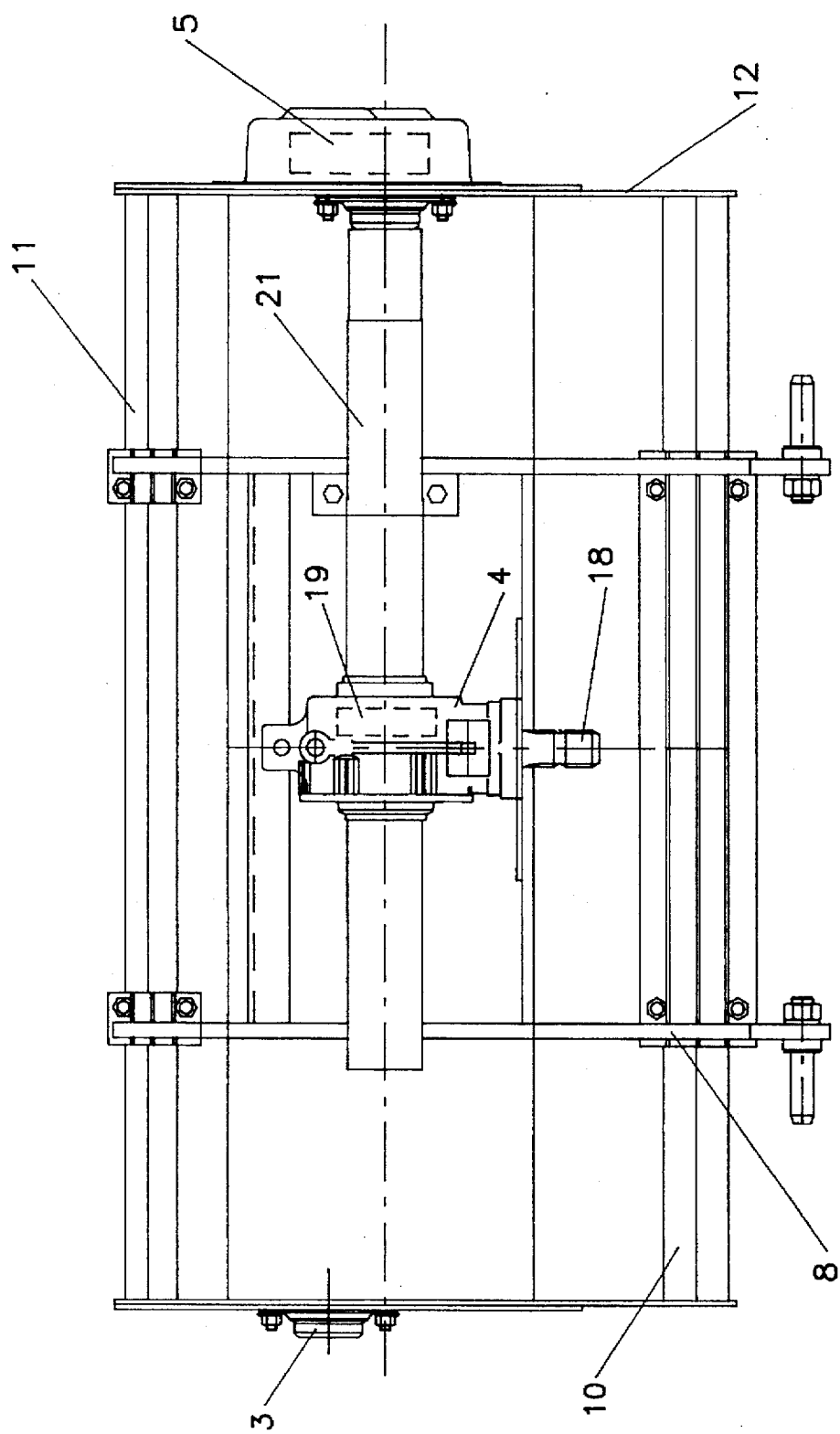
FIG. 3 is a plan view of a cutter in accordance with the invention
Figure 4:
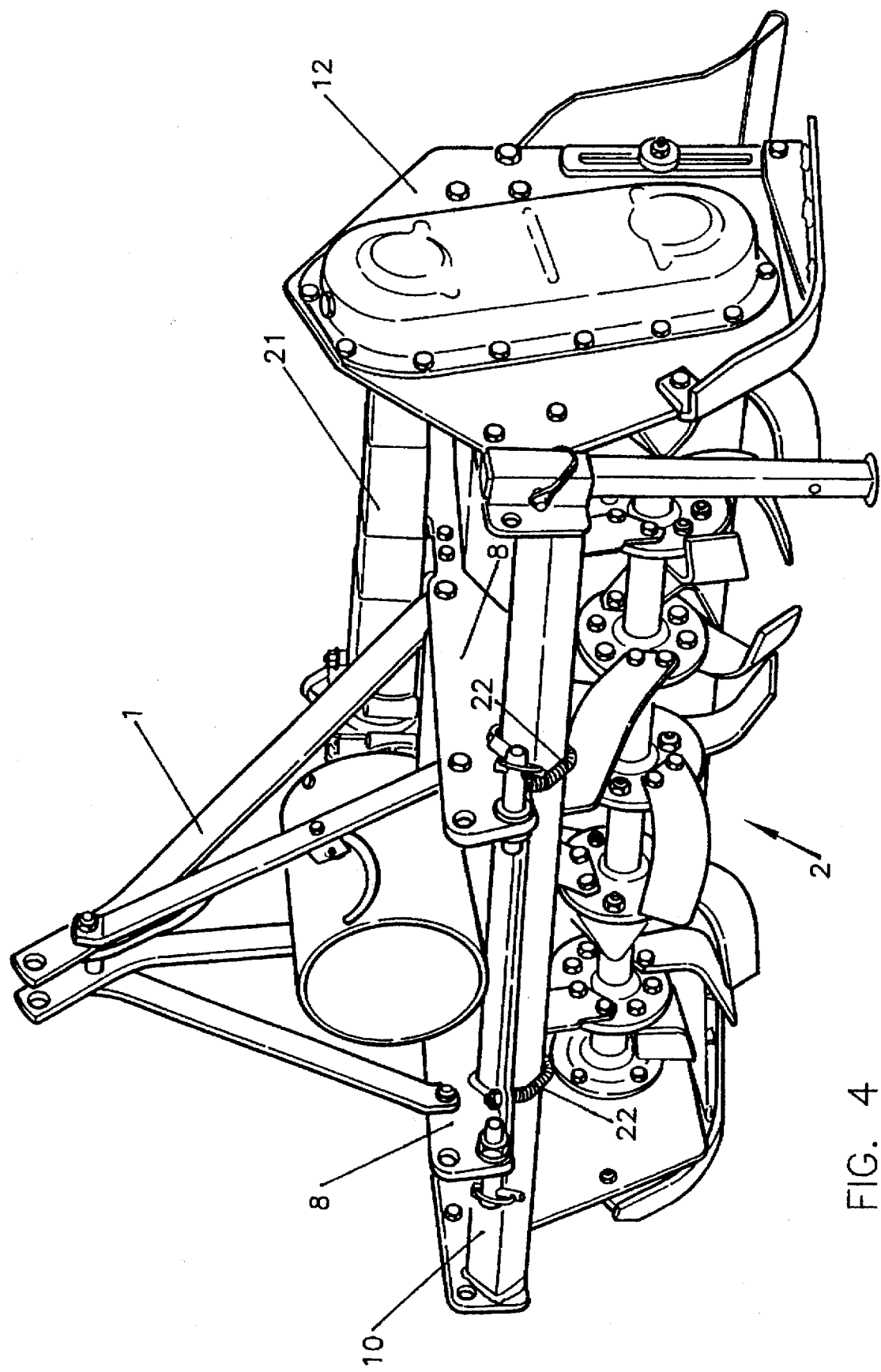
FIG. 4 is a front perspective view of the cutter in accordance with the invention
Figure 5:
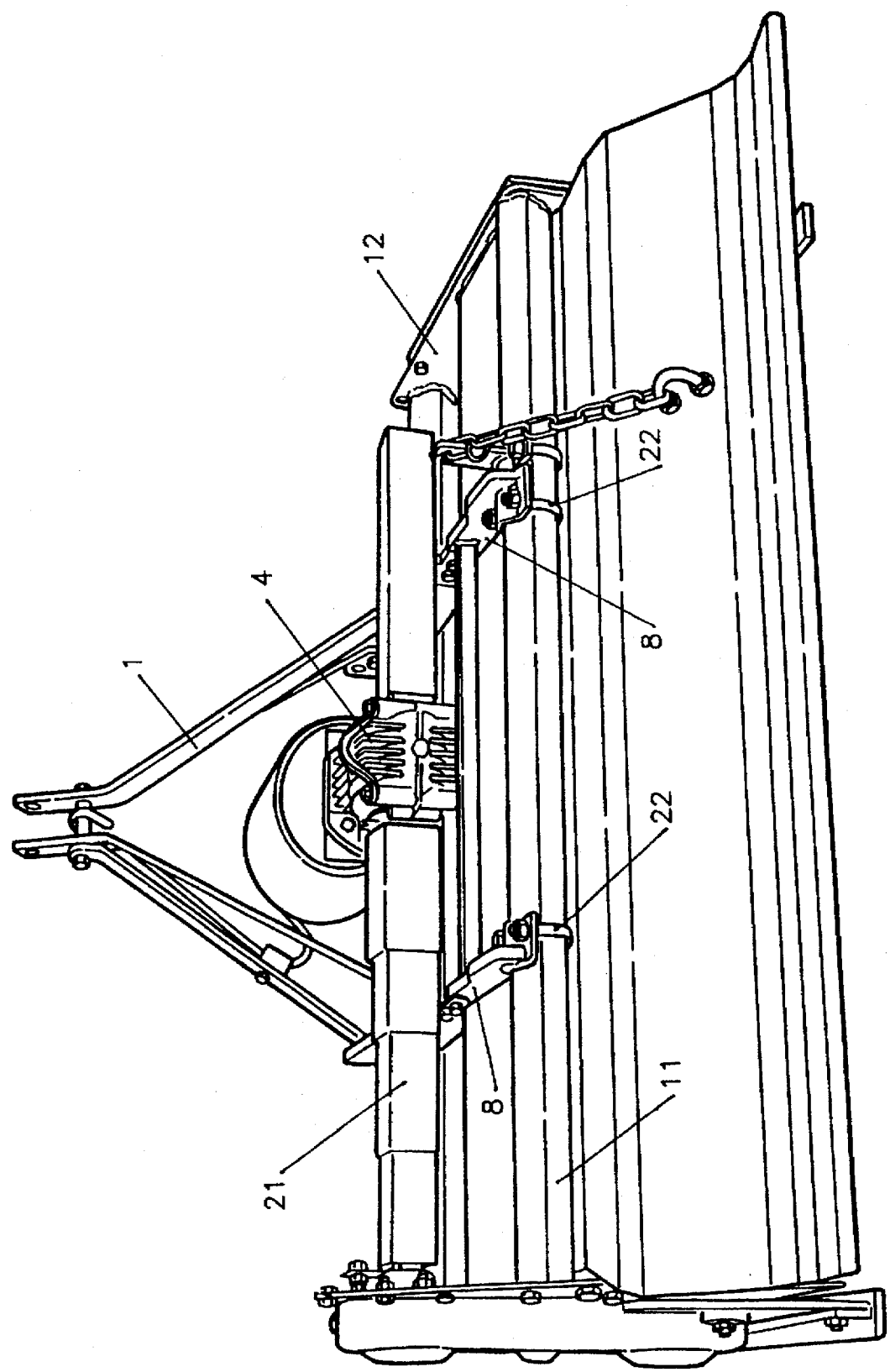
FIG. 5 is a rear perspective view of the cutter in accordance with the invention.

However, this makes it necessary to lengthen arms 8 connecting the machine to the tractor, which thus becomes less rigid and more flexible, with all the drawbacks this creates, as well as increasing the dimensions of the machine. These drawbacks are eliminated by the cutter in accordance with the invention, the configuration of which is illustrated in FIG. 2.

In that figure, the parts corresponding to those in FIG. 1 are indicated with the same numbers.

In the cutter in accordance with the invention, the frame comprises a pair of bars 10 and 11, one at the front and one at the back, constituted, for example, by steel sections or the like of sufficient thickness.

These bars constitute an integral part of the frame, which also comprises a pair of side plates 12 and a top covering plate 13.

A pair of slides 14, fitted with an arm 15 containing a slot 16 through which passes an anchor bolt 17, are hinged to side plates 12; the bolt enables the slide to be fixed at various heights in order to regulate the depth of cultivation.

Slide 14, which rests on the ground, determines the depth to which the blades of rotor 2 penetrate the soil.

A characteristic of the invention is that drive unit 4 is located towards the front of the machine, ie. forward of an approximately vertical axis A—A which passes through the center of rotor shaft 3.

This enables the dimensions of the machine to be kept compact, as rear bar 11 can be connected near the rotor without obstructing the drive mechanisms; equally, the fact that the center of gravity is closer to the connection to the tractor improves the stability and rigidity of the machine.

This system produces a machine which, despite its highly rigid structure, is of minimal size.

Side plates 12, which may be made, for example, of steel sections or tubular steel of suitable thickness, are welded to bars 10 and 11, and rotor 2 is fitted to them.

The motion is transmitted from the power take-off of the tractor to input shaft 18 of drive unit 4 and then, via a bevel gear pair, possibly with the interposition of reduction devices, to a cogwheel 19 which is fitted to a polygonal shaft 20.

One end of shaft 20 is integral with wheel 5 which transmits the motion, via a chain, to rotor 2, while on the opposite side shaft 20 is fitted to wheel 19, in relation to which it can slide freely.

A telescopic guard 21 is fixed on one side to drive unit 10 and on the other side to plate 6, to protect shaft 20.

Support 1, with the corresponding arms 8 which are integral with drive unit 4, can then slide on bars or sections 10 and 11, thus enabling the position of the cutter body in relation to the tractor to be changed and fixed in the required position by brackets 22, which are secured by nuts.

In this way, the body of the cutter is rigidly anchored to its support.

To move the cutter sideways, from one side or the other in relation to the tractor, it is sufficient to loosen the nuts securing brackets 22, thus releasing the cutter frame from supports 8.

At this point supports 8 can slide freely along bars 10 and 11, in order to place the cutter in the most suitable operating position in relation to the tractor.

During this movement, polygonal shaft 20 slides along the seating in cogwheel 19, but always remains protected by guard 21.

When the bolts of brackets 22 have been tightened, the machine is ready to operate again.

I claim:

1. A horizontal-axis cutter for soil cultivation as the cutter moves in a working direction, comprising:

a front bar (10) extending transversely to the working direction;

a rear bar (11) extending transversely to the working direction and spaced rearwardly from the front bar with respect to the working direction;

a pair of spaced apart side plates (12), said front and rear bars being fixed between said side plates;

a horizontal-axis rotor (2) carrying tools for cultivating soil, mounted for rotation between said plates and between said front and rear bars;

a support (1) for connecting the cutter to a tractor, the support being slidably mounted for movement transverse to the working direction on said front and rear bars;

means (22) for locking said support at a selected transverse position between said side plates and to said front and rear bars;

a gear motor adapted to be connected to a power take-off of a tractor, mounted to said support and connected to said rotor for rotating said rotor; and said rotor having a horizontal axis and a vertical plane (A—A) extending through said horizontal axis, said gear motor being located forward of said vertical plane with respect to the working direction.

2. A horizontal-axis cutter according to claim 1, wherein said front and rear bars are positioned above said rotor and said gear motor is positioned above said front and rear bars.

3. A horizontal-axis cutter according to claim 2, wherein said means for locking comprises a plurality of brackets, each engaged around one of said bars and extending to said support, and nuts for fixing said brackets to said bars and to said support.

4. A horizontal-axis cutter according to claim 1, including a polygonal shaft (20) mounted for rotation to one of said side plates, said gear motor being slidably mounted to said polygonal shaft for sliding movement along said shaft when said support slides along said front and rear bars.

5. A horizontal-axis cutter according to claim 4, including a slide (14) mounted to each of said side plates and means for adjusting a vertical position of said slide with respect to said side plates for adjusting a depth of cultivation for said rotor.

6. A horizontal-axis cutter according to claim 5, wherein said gear motor includes a cogwheel (19) slidably mounted to said polygonal shaft and rotatable for rotating said polygonal shaft, and means connecting said shaft to said rotor for transmitting rotation of said shaft into rotation of said rotor.

7. A horizontal-axis cutter according to claim 6, including a telescopic guide connected to one of said side plates and extending over said polygonal shaft for covering said polygonal shaft.

8. A horizontal-axis cutter according to claim 1, including a slide (14) mounted to each of said side plates and means for adjusting a vertical position of said slide with respect to said side plates for adjusting a depth of cultivation for said rotor.

* * * * *